United States Patent

Lee

[11] 4,050,308
[45] Sept. 27, 1977

[54] ELECTRONIC FISH LOCATOR

[76] Inventor: Jimmy Luther Lee, 1045E Shary Court, Clayton, Calif. 94518

[21] Appl. No.: 707,563

[22] Filed: July 22, 1976

[51] Int. Cl.² .................................................. G01K 7/24
[52] U.S. Cl. ........................... 73/362 AR; 73/170 A; 340/228 R; 340/378 R
[58] Field of Search .................. 73/170 A, 362 AR; 324/96; 340/227 R, 228 R, 172, 378

[56] References Cited

U.S. PATENT DOCUMENTS

| | | | |
|---|---|---|---|
| 2,741,126 | 4/1956 | Anderson et al. | 73/170 |
| 3,339,407 | 5/1967 | Campbell et al. | 73/170 |
| 3,796,951 | 3/1974 | Joseph | 340/378 |
| 3,922,808 | 12/1975 | Rieth et al. | 73/170 |
| 3,927,571 | 12/1973 | Athey | 73/362 |
| 3,946,364 | 3/1976 | Codomo et al. | 73/340 |
| 3,969,672 | 7/1976 | Wallander | 340/378 |
| 3,987,392 | 10/1976 | Kugelman et al. | 324/96 |

*Primary Examiner*—Herbert Goldstein

[57] ABSTRACT

Apparatus for determining the depth of certain temperature layers or strata in ponds, lakes, etc. The disclosed apparatus includes a thermistor, an electrical wire or cable attached to the thermistor and provided with depth measurement markings in a simple graphic code, and a translator circuit adapted to be attached to the end of the wire or cable remote from the thermistor for translating the resistance of the thermistor into an indication of the temperature range of the water layer or stratum in which the thermistor is immersed. The translator circuit includes a set of light-emitting diodes (LED's) for use in indicating the temperature range of the water stratum in which the thermistor is immersed. In general, when the disclosed apparatus is in use only one LED, corresponding to the temperature of the water stratum in which the thermistor is immersed carries sufficient current to be perceptibly illuminated. At one extreme of temperature indication, however, a second LED may appear to be faintly illuminated. The translator circuit is battery-operated, and is self-compensating for aging variations in battery voltage throughout the practical life of the battery, i.e., until the light produced by the illuminated LED is too dim to be readily perceived in the ambient sunlight in an open boat.

2 Claims, 2 Drawing Figures

ELECTRONIC FISH LOCATOR

BACKGROUND OF THE INVENTION

1. Field of the Invention

The present invention relates to apparatus of the type sometimes called "fish locators" for determining the depth of certain temperature layers or strata in ponds, lakes, etc., in which fish of certain kinds are known to preferentially congregate, and more particularly to improved battery-operated fish locator apparatus which are self-compensating for changes in battery voltage due to aging and thus do not require to be manually adjusted to compensate for battery aging.

2. Description of the Prior Art

Fish locators in which the translator unit comprises a bridge circuit and a meter of the D'Arsonval type for indicating the temperature range of the water layer or stratum in which the temperature sensing element is located are well known in the prior art. As is well known, however, such bridge circuit arrangements are sensitive to variations in supply voltage. Thus, these prior art fish locator devices require to be manually adjusted to compensate for changes in the voltage of their batteries due to aging, and are provided with at least two potentiometers which the user must manually adjust in order to keep the meter readings accurate. Further, the user of these prior art fish locator devices is required to provide at least two baths of suitable temperature in which to successively immerse the temperature sensing element during manual compensation, and sometimes as many as five such baths. Yet further, the control means for these compensating potentiometers are located inside the cases of the prior art translator units, which must be opened during the manual compensating operations. Thus, these prior art fish locator devices are subject to problems brought about by the exposure of the translator circuit to moisture, and can be sealed against the entrance of moisture only with considerable difficulty and at considerable expense. Also, the D'Arsonval-type meters used in these prior art fish locator devices are inherently delicate and fragile and are subject to being rendered inaccurate or completely inoperative by the rough handling to which all fish tackle is sometimes subjected when in use or being carried in a tackle box or the like.

SUMMARY OF THE INVENTION

Accordingly, it is an object of the present invention to provide a battery-operated electronic fish locator which never requires manual compensation for battery aging.

Another object of the present invention is to provide a battery-operated electronic fish locator the translator circuit of which can be encapsulated or cheaply and easily sealed to prevent it from being exposed to moisture and suffering the consequent deleterious effects.

Yet another object of the present invention is to provide a battery-operated fish locator having a solid-state temperature display rather than a delicate and fragile D'Arsonval-type meter.

A further object of the present invention is to provide a battery-operated fish locator possessing several or all of the above-described advantages and at the same time having a translator unit which is of "shirt pocket" size.

A yet further object of the present invention is to provide a battery-operated fish locator in which the water stratum temperature is displayed to the user by means of a simple linear array of LED's, rather than a D'Arsonval-type meter, and thus is more easily used by a fisherman who is not familiar with electrical meters.

A still further object of the present invention is to provide such a battery-operated fish locator in which only one LED at a time of said linear array is perceptibly illuminated.

Other objects of the present invention will in part be obvious and will in part appear hereinafter.

The present invention, accordingly, comprises the features of construction, combinations of elements, and arrangements of parts which will be exemplified in the constructions hereinafter set forth, and the scope of the present invention will be indicated in the claims.

In accordance with a principal feature of the present invention, an electronic fish locator comprises a plurality of series-connected resistors which are connectable across a power supply battery when an energizing switch is closed and a plurality of integrated circuit comparators each receiving a reference signal from one of the junction points between said resistors.

In accordance with another principal feature of the present invention, each of said integrated circuit comparators drives one LED of a linear array of LED's which serves to indicate the temperature range of the water stratum in which the temperature sensing element of the fish locator is immersed.

In accordance with yet another principal feature of the present invention, diodes are connected between the adjacent terminals of said LED's remote from said integrated circuit comparators so that only one of said LED's appears to be illuminated at one time under outdoor direct sunlight conditions.

In accordance with yet another aspect of the present invention, the translator circuit of the electronic fish locator of the present invention may be encapsulated or located in a sealed compartment separate from the battery compartment and thus protected from moisture.

For a fuller understanding of the nature and objects of the present invention reference should be had to the following detailed description, taken in conjunction with the accompanying drawings.

DESCRIPTION OF THE PREFERRED EMBODIMENT

Figure 1:
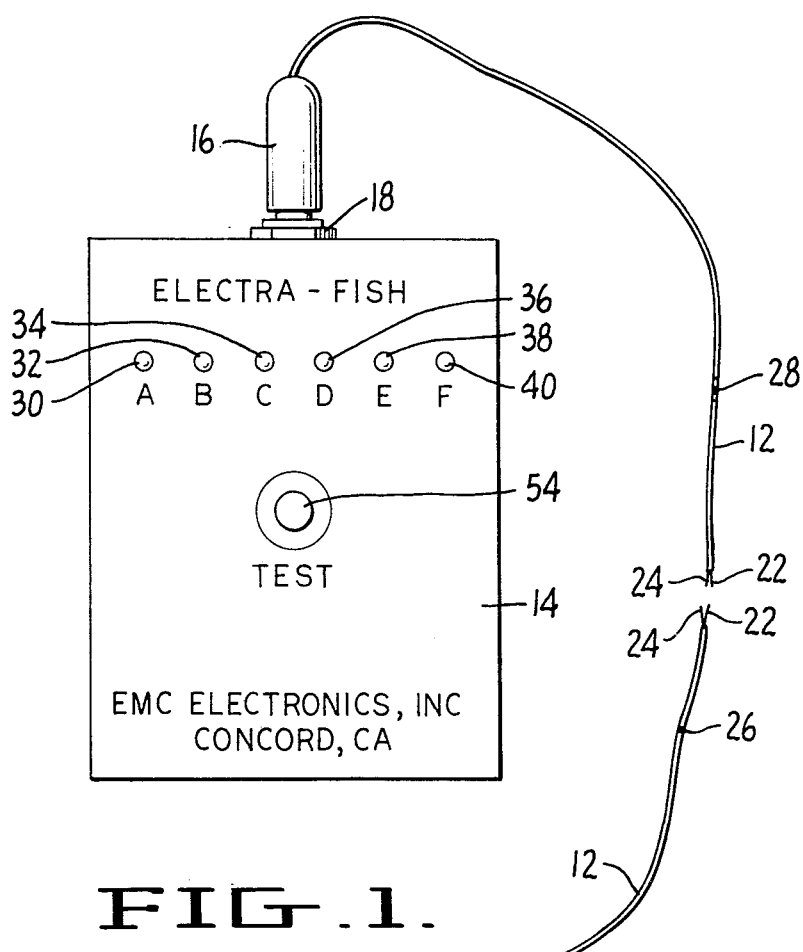
FIG. 1 is a plan view of an electronic fish locator embodying the present invention.

Referring now to FIG. 1, it will be seen that an electronic fish locator embodying the present invention comprises a thermistor 10, protected by a suitable housing 11, a cable 12, a translator unit 14, and a plug 16. When plug 16 is inserted into the input jack 18 of translator unit 14, thermistor 10 is connected into the translator circuit located within translator unit 14.

As further seen in FIG. 1, thermistor housing 11 comprises a sleeve 19, which may be formed from copper, for example, and thermistor 10 is encapsulated in sleeve 19 by means of a thermally conductive material such as a thermally conductive epoxy compound of the well-known type. Sleeve 19 is flattened at its lower end (remote from cable 12), and the flattened lower end is provided with a hole 20 for use in affixing a sinker to thermistor housing 11.

Cable 12 is preferably of very light gauge, and contains two lines or wires 22, 24. In the preferred embodiment cable 12 is about 75 feet in length, and is provided with depth measurement markings in a simple graphic code. In the code employed in the preferred embodiment depth marking 26 indicates a point on cable 12 located 10 feet from thermistor 10, and depth marking 28 indicates a point on cable 12 located 70 feet from thermistor 10.

Going to translator unit 14 (FIG. 1) it will be seen that six openings 30, 32, 34, 36, 38, 40 through the top face of the case of translator unit 14 are provided in a linear array. These openings are preferably closed by means of translucent material in order to protect the translator circuit within the case of translator unit 14 from moisture while at the same time passing light emitted by a corresponding set of six light-emitting diodes (LED's) 42, 44, 46, 48, 50, 52 (FIG. 2), one of which is located directly inside each of said openings. In the prefereed embodiment LED 42 is located immediately inside opening 30, LED 44 is located immediately inside opening 32, LED 46 is located immediately inside opening 34, etc.

As also seen in FIG. 1, translator unit 14 is provided with a push-button switch 54 by means of which the user may energize the translator circuit only when the fish locator of the preferred embodiment is in use, thus extending battery life.

Figure 2:
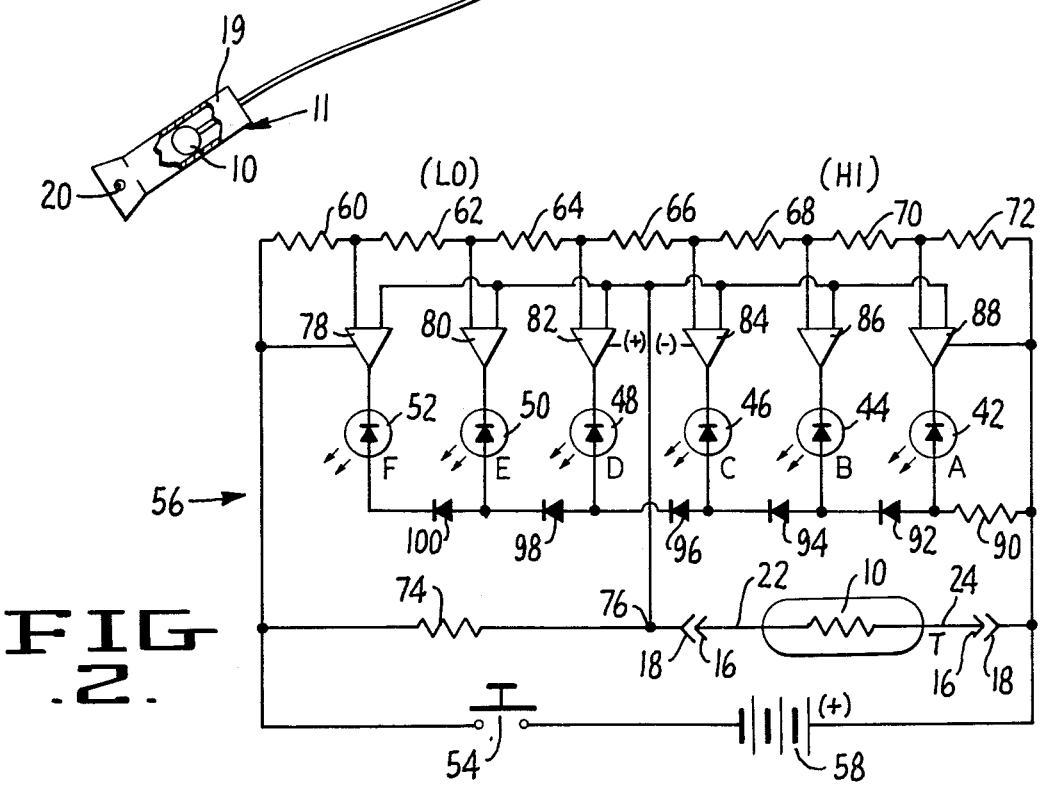
FIG. 2 is a schematic drawing of the translator circuit of the electronic fish locator shown in FIG. 1.

Referring now to FIG. 2, there is shown the translator circuit 56 of the preferred embodiment of the present invention. Translator circuit 56 is energized by means of a conventional nine volt transistor battery 58, when and only when push-button switch 54 is closed by the user of the device of the preferred embodiment.

A plurality of resistors 60, 62, 64, 66, 68, 70, 72 are connected across the terminals of battery 58 when switch 54 is closed, and serve as a voltage divider. In the preferred embodiment resistor 60 is a 6800 ohm resistor, resistors 62, 64, 66, 68 and 70 are 2200 ohm resistors, and resistor 72 is a 22,000 ohm resistor. All of these resistors are 5% tolerance resistors, rated at ¼ watt.

Also connected across the terminals of battery 58 when switch 54 is closed are thermistor 10 and a resistor 74. In the preferred embodiment resistor 74 is a 1500 ohm resistor, 5% tolerance, rated at ¼ watt. As will be evident to those having ordinary skill in the art from inspection of FIG. 2, however, thermistor 10 is not located within translator unit 14 (FIG. 1), but rather it is interconnected with the translator circuit of FIG. 2 by means of two wires 22, 24 of cable 12, plug 16, and jack 18.

In the preferred embodiment thermistor 10 is an NTC resistance unit of the kind made and sold by the Keystone Carbon Company under the designation RL2007-1164-97-D1, having a nominal resistance of 1800 ohms. This resistance unit has over its rated operating range a negative temperature coefficient of 4.96 ohms per degree centigrade.

Thus, it will be seen that the voltage occurring at junction 76 between resistor 74 and thermistor 10, whenever switch 56 is closed, will be a function of the temperature of thermistor 10. For this reason, the voltage at junction 76 will hereinafter be called the "common temperature signal," or "temperature signal."

The temperature signal from junction 76 is applied to one input terminal of each one of a plurality of comparators 78, 80, 82, 84, 86, 88. In the preferred embodiment these comparators are sections of two LM339 quad comparators of the standard type well known in the art. Comparators 78, 80, and 82, for instance, may be sections of one quad comparator integrated circuit while comparators 84, 86 and 88 may be sections of the other quad comparator integrated circuit used in the device of the preferred embodiment. The biasing connections of these quad comparators are made in the well-known manner, which is indicated schematically only.

In addition to the common temperature signal, each comparator receives a unique reference signal from one corresponding junction of the voltage divider made up of resistors 60, 62, 64, 66, 68, 70, and 72. These signals will generally be called herein the "reference signals." The comparators are so selected and biased that whenever the common temperature signal from junction 76 applied to one of its input terminals becomes more positive than the reference signal applied to its other terminal that comparator will be switched on, and the voltage at its output terminal will drop to a negative level sufficiently low to bring about the illumination of its associated LED, except when the illumination of its LED is suppressed by an associated suppressor diode, as described hereinafter.

In the preferred embodiment the LED's 42, 44, 46, 48, 50, 52 are all Litronix LED's of the type identified by the commercial designation RL4484.

As will be obvious to those having ordinary skill in the art, informed by the present disclosure, the illuminating current circuits of the LED's are completed through a common resistor 90 and a plurality of suppressing diodes 92, 94, 96, 98 and 100. In the preferred embodiment the suppressing diodes are all 1N4148 diodes, and common resistor 90 is a 680 ohm resistor, 5% tolerance, rated at ¼ watt.

OPERATION

In making use of the device of the preferred embodiment the user affixes a sinker to thermistor housing 11 by means of hole 20, and then drops thermistor housing 11, on the end of cable 12, to a predetermined depth in a body of water such as a lake, pond, stream, etc. Thermistor 10 will then assume a particular resistance value dependent upon the temperature of the water immediately surrounding it. When the user closes switch 54 a current will flow through thermistor 10 and resistor 74, and the common temperature signal at junction 76 will assume a value corresponding to the temperature of thermistor 10.

Assuming that the common temperature signal is more positive than the reference signals on the reference signal inputs of comparators 78, 80, and 82, but is more negative than the reference signals at the reference input terminals of comparators 84, 86, and 88, comparators 78, 80, and 82 will be switched on, and comparators 84, 86, and 88 will not be switched on.

Thus, the output terminals of comparators 78, 80, and 82 will be sufficiently negative to illuminate their corresponding LED's 52, 50, and 48, while the output terminals of comparators 84, 86, and 88 will remain too positive to illuminate their corresponding LED's 46, 44, and 42.

LED 48 will be immediately brightly illuminated, sufficiently brightly to be seen in bright ambient sunlight through opening 36 (FIG. 1).

The current flowing to LED's 50 and 52, however, will be considerably reduced by the presence of suppressing diodes 98 and 100, to the extent that LED's 50 and 52 will not be perceptibly illuminated when translator unit 14 is viewed in bright ambient sunlight. Thus, the illumination of all but one of the LED's will be so suppressed that the user will perceive only one LED, corresponding to the temperature of the water immediately adjacent thermistor 10, to be illuminated, and the reading of the solid state display of the device of the preferred embodiment will be rendered much easier for those not acquainted with electrical and electronic displays.

Within the temperature range of the device of the preferred embodiment only one LED will be thus perceptibly illuminated, corresponding to the temperature of the water immediately adjacent thermistor 10 when switch 54 is closed by the user.

In the device of the preferred embodiment, given the component values set out herein, LED-A (42) will be illuminated when thermistor 10 experiences temperatures from 73° to 83° F., LED-B (44) will be illuminated at 66° to 73° F., LED-C (46) will be illuminated at temperatures of 58° to 66°, LED-D (48) will be illuminated at 46° to 58°, LED-E (50) will be illuminated at 38° to 46°, and LED-F (52) will be illuminated at 30° to 38°. Further, this temperature calibration will remain accurate to a close approximation over the useful life of battery 58, in contradistinction to the devices of the prior art which require frequent and complex recalibration procedures.

Further, the user of the device of the preferred embodiment is provided with a chart from which he can read the letter designation of the LED which illuminates when thermistor 10 is located in water temperature strata preferred by certain species of fish. This temperature reference chart reads in part: Alewife-D, Bluegill-B, Brook Trout-D, Brown Trout-C, Catfish-A, etc.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings shall be interpreted as illustrative only, and not in a limiting means.

It is also to be understood that the following claims are intended to cover all of the generic and specific features of the invention hereindescribed and all statements of the scope of the invention which might, as a matter of language, be said to fall therebetween.

What is claimed is:

1. An electronic fish locator, comprising:
a first conductor;
a second conductor;
voltage divider means having a first end terminal connected directly to said first conductor, a second end terminal connected directly to said second conductor, and a plurality of intermediate terminals for producing reference voltages;
temperature signal conductor means;
fixed resistance means having a first terminal directly connected to said first conductor and a second terminal directly connected to said temperature signal conductor means;
temperature sensitive resistance means;
flexible cable means for connecting said temperature sensitive resistance means directly between said second conductor and said temperature signal conductor means;
switch means for connecting a battery between said first conductor and said second conductor;
comparing means for comparing said reference voltages with the voltage of said temperature signal conductor means when said switch means is closed; and
indicating means for indicating the ones of said reference voltages between which the voltage of said temperature signal conductor means lies;
said comparing means comprising a plurality of integrated comparator circuits, said indicating means comprising a plurality of light-emitting diodes, each of said light-emitting diodes being connected to the output terminal of one of said integrated comparator circuits to receive current therefrom, and each pair of light-emitting diodes controlled by signals from adjacent terminals of said voltage divider means being provided with a diode connected between the light-emitting diode terminals which are not connected directly to integrated comparator circuits.

2. An electronic fish locator, comprising:
a first conductor;
a second conductor;
voltage divider means having a first end terminal connected directly to said first conductor, a second end terminal connected directly to said second conductor, and a plurality of intermediate terminals for producing reference voltages;
temperature signal conductor means;
fixed resistance means having a first terminal directly connected to said first conductor and a second terminal directly connected to said temperature signal conductor means;
temperature sensitive resistance means;
flexible cable means for connecting said temperature sensitive resistance means directly between said second conductor and said temperature signal conductor means;
switch means for connecting a battery between said first conductor and said second conductor;
a plurality of integrated comparator circuits for comparing said reference voltages with the voltage of said temperature signal conductor means when said switch means is closed; and
a plurality of light-emitting diodes connected to the output terminals of corresponding ones of said integrated comparator circuits for indicating the ones of said reference voltages between which the voltage of said temperature signal conductor means lies;
each pair of light-emitting diodes controlled by signals from adjacent terminals of said voltage divider means being provided with a diode connected between the light-emitting diode terminals which are not connected directly to comparator circuits.

* * * * *